United States Patent
Sun et al.

(10) Patent No.: US 10,734,035 B1
(45) Date of Patent: Aug. 4, 2020

(54) HUMIDITY CONTROL SYSTEM FOR HEAT-ASSISTED MAGNETIC RECORDING HARD DISK DRIVE

(71) Applicant: Seagate Technology LLC, Cupertino, CA (US)

(72) Inventors: Hao Sun, Singapore (SG); Noppavit Yongrattana, Samut Prakarn (TH); Lionel Young, Singapore (SG); Yap Pow Ming, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/526,058

(22) Filed: Jul. 30, 2019

Related U.S. Application Data (60) Provisional application No. 62/711,804, filed on Jul. 30, 2018.

(51) Int. Cl.
*G11B 33/14* (2006.01)
*G11B 5/00* (2006.01)

(52) U.S. Cl.
CPC .. *G11B 33/1406* (2013.01); *G11B 2005/0021* (2013.01)

(58) Field of Classification Search
CPC . C25B 9/10; C25B 1/10; C25B 13/08; H01M 8/04835; C25D 17/002; F21S 45/33; Y02E 60/366
See application file for complete search history.

(56) References Cited

U.S. PATENT DOCUMENTS

| | | | | |
|---|---|---|---|---|
| 4,967,295 A * | 10/1990 | Yamauchi | ............... | B01D 53/26 236/44 R |
| 5,012,360 A * | 4/1991 | Yamauchi | .......... | G11B 33/1453 236/44 E |
| 5,118,261 A * | 6/1992 | Yamauchi | ............... | B01D 53/26 204/242 |
| 5,342,500 A * | 8/1994 | Inanaga | ................. | G11B 33/10 204/421 |
| 5,396,796 A * | 3/1995 | Kotani | ................. | G01N 27/121 73/335.02 |
| 5,650,890 A * | 7/1997 | Kuroki | ............... | G11B 33/1453 360/99.16 |
| 5,907,454 A * | 5/1999 | Ahn | ................... | G11B 33/1453 360/97.18 |
| 6,335,843 B2 * | 1/2002 | Yotsuya | .................. | G11B 5/54 360/128 |

(Continued)

*Primary Examiner* — Brian E Miller
(74) *Attorney, Agent, or Firm* — Mueting Raasch Group (57) ABSTRACT

A hard disk drive comprises a sensor configured to detect a mixing ratio within the hard disk drive and a membrane electrode assembly. The membrane electrode assembly comprises a gas flow path that couples an inside of the hard disk drive to an outside of the hard disk drive, and the gas flow path includes a cathode and anode that electrolytically remove water vapor from the inside of the hard disk drive. The drive further includes an energy source coupled to the membrane electrode assembly and a controller coupled to the sensor and the energy source. The controller is configured to activate the energy source in response to the sensor detecting a mixing ratio greater than a threshold mixing ratio and to deactivate the energy source in response to the sensor detecting a mixing ratio less than the threshold mixing ratio.

17 Claims, 7 Drawing Sheets

(56) References Cited

U.S. PATENT DOCUMENTS

| | | | | |
|---|---|---|---|---|
| 6,453,679 | B1* | 9/2002 | Aoyagi | B01D 53/26 |
| | | | | 62/279 |
| 6,735,044 | B2* | 5/2004 | Tomioka | G11B 33/1453 |
| | | | | 360/97.12 |
| 7,306,659 | B2* | 12/2007 | Gorton | B01D 46/0032 |
| | | | | 360/97.17 |
| 7,333,283 | B2* | 2/2008 | Akamatsu | G11B 33/14 |
| | | | | 360/69 |
| 7,420,760 | B2* | 9/2008 | Zhang | G11B 5/6064 |
| | | | | 360/75 |
| 7,460,333 | B2* | 12/2008 | Akamatsu | G11B 33/1453 |
| | | | | 360/97.12 |
| 7,542,226 | B2* | 6/2009 | Lee | G11B 19/046 |
| | | | | 360/75 |
| 7,688,543 | B2* | 3/2010 | Lee | G11B 33/1453 |
| | | | | 360/97.12 |
| 2008/0180835 | A1* | 7/2008 | Strom | G11B 25/043 |
| | | | | 360/97.16 |
| 2010/0027154 | A1* | 2/2010 | Sonoda | G11B 5/6005 |
| | | | | 360/75 |
| 2010/0079913 | A1* | 4/2010 | Okamoto | G11B 5/3136 |
| | | | | 360/128 |
| 2011/0211276 | A1* | 9/2011 | Tsunoda | G11B 5/6005 |
| | | | | 360/75 |
| 2015/0096884 | A1* | 4/2015 | Shealy | C25B 9/10 |
| | | | | 204/252 |
| 2019/0165405 | A1* | 5/2019 | Wang | H01M 8/2483 |
| 2019/0319283 | A1* | 10/2019 | Shibata | H01M 8/1004 |

* cited by examiner

HUMIDITY CONTROL SYSTEM FOR HEAT-ASSISTED MAGNETIC RECORDING HARD DISK DRIVE

RELATED APPLICATIONS

This application claims the benefit of provisional Patent Application Ser. No. 62/711,804, filed on Jul. 30, 2018, which is incorporated herein by reference in its entirety.

SUMMARY

Various embodiments are directed to a hard disk drive comprising a sensor configured to detect a mixing ratio within the hard disk drive and a membrane electrode assembly. The membrane electrode assembly comprises a gas flow path that couples an inside of the hard disk drive to an outside of the hard disk drive, and the gas flow path includes a cathode and anode that electrolytically remove water vapor from the inside of the hard disk drive. The drive further includes an energy source coupled to the membrane electrode assembly and a controller coupled to the sensor and the energy source. The controller is configured to activate the energy source in response to the sensor detecting a mixing ratio greater than a threshold mixing ratio and to deactivate the energy source in response to the sensor detecting a mixing ratio less than the threshold mixing ratio.

Further embodiments are directed to a hard disk drive comprising a sensor configured to detect humidity within the hard disk drive. A membrane electrode assembly comprises a gas flow path that couples an inside of the hard disk drive to an outside of the hard disk drive. The gas flow path comprises a cathode and anode that electrolytically remove water vapor from the inside of the hard disk drive. An energy source is coupled to the anode and the cathode of the membrane electrode assembly. A controller is coupled to the sensor and the energy source. The controller is configured to activate the energy source in response to the sensor detecting a humidity greater than a first threshold humidity and to deactivate the energy source in response to the sensor detecting a humidity less than a second threshold humidity.

Additional embodiments are directed to a method for actively controlling humidity within a hard disk drive. The method includes detecting a first humidity by a sensor within a hard disk drive. In response to the first humidity being greater than a threshold humidity, an energy source is activated. The energy source is coupled to a membrane electrode assembly integrated into the hard disk drive and comprises a gas flow path that couples an inside of the hard disk drive to an outside of the hard disk drive. Water vapor is electrolytically removed from the inside of the hard disk drive via the membrane electrode assembly. A second humidity is then detected by the sensor within the hard disk drive. In response to the second humidity being less than the threshold humidity, the energy source is deactivated.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

DETAILED DESCRIPTION

A computer disk drive is a sealed, carefully controlled environment. In a confined space, precision instruments are electrically controlled in tangent with magnetic fields to write and/or read a significant amount of information—areal storage densities well beyond 1 $Tb/in^2$, e.g., to 5 $Tb/in^2$ in theory. These storage densities are achieved through heat-assisted magnetic recording (HAMR), also sometimes referred to as energy-assisted magnetic recording (EAMR), thermally-assisted recording (TAR), thermally-assisted magnetic recording (TAMR), etc. As with a conventional hard disk drive (HDD), a HAMR HDD includes a magnetic disk and recording head. Unlike a conventional drive, a HAMR device has a source of optical energy (e.g., a laser diode) integrated with the recording head that couples optical energy to a waveguide or other light transmission path. The waveguide delivers the optical energy to a near-field transducer (NFT). The NFT concentrates the optical energy into a tiny optical spot in a recording layer of the disk, which raises the media temperature locally, reducing the writing magnetic field required for high-density recording.

The HAMR recording process starts by heating a small region of the disk above Curie temperature ($T_c$) using a laser powered near-field plasmonic transducer, which can raise temperatures for certain components in the disk drive to 350-450° C. These temperatures cause reactions among materials in the recording components and/or disk drive atmosphere (e.g., the fill gas) which can generate contaminants in the drive, including water vapor/humidity. Those contaminants lead to performance degradation, reduced liability, and/or reduced lifetime operability. Studies suggest that internal drive humidity is the greatest environmental threat to drive endurance/viability. Embodiments described herein address a system for controlling humidity within a HAMR HDD.

Figure 1:
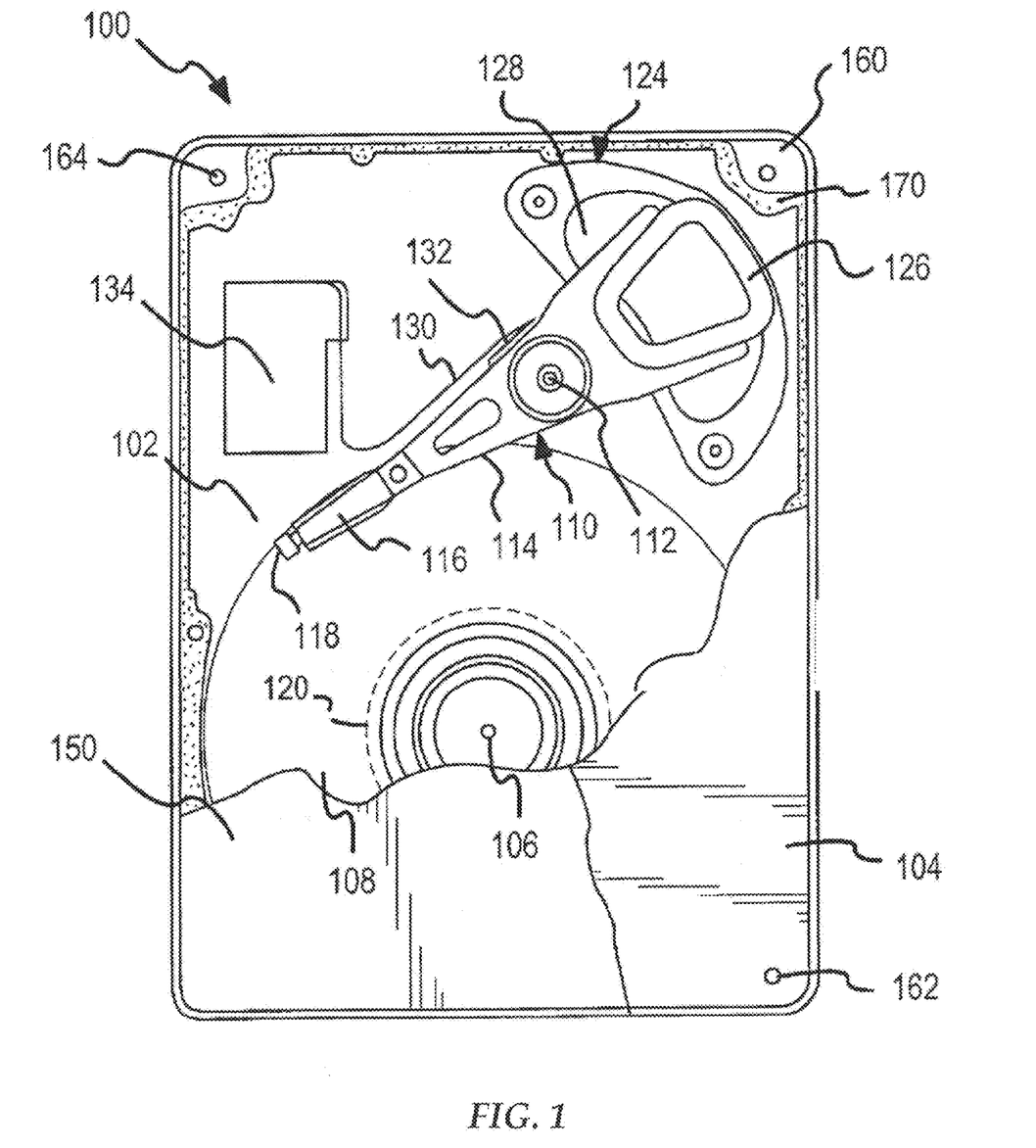
FIG. 1 shows a disk drive configured for heat-assisted magnetic recording, in accordance with various embodiments.

A disk drive 100 configured for heat-assisted magnetic recording in accordance with various embodiments is shown in FIG. 1. The disk drive 100 includes a base 102 to which various components of the disk drive 100 are mounted. A structural cover 104, shown partially cut away, cooperates with the base 102 to form a housing that defines an internal environment for the disk drive 100. The drive components include a spindle motor 106, which rotates one or more disks 108 at a constant high speed. Information is written to and read from tracks on the disks 108 through the use of an actuator assembly 110, which rotates during operation about a bearing shaft assembly 112 positioned adjacent the disks 108. The actuator assembly 110 includes a plurality of actuator arms 114 which extend towards the disks 108, with one or more flexures 116 extending from each of the actuator arms 114. Mounted at the distal end of each of the flexures 116 is a read/write head 118, which includes a slider enabling the head 118 to fly in close proximity above the corresponding surface of the associated disk 108.

During operation, the track position of the heads 118 is controlled through the use of a voice coil motor 124, which typically includes a coil 126 attached to the actuator assembly 110, as well as one or more permanent magnets 128, which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the disks 108.

The spindle motor 106 is typically de-energized when the disk drive 100 is not in use for extended periods of time. The heads 118 are moved over a park zone 120 near the inner diameter of the disks 108 when the drive motor is de-energized. The heads 118 are secured over the park zone 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected, the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disk drive printed circuit board mounted to the bottom side of the disk drive 100.

Figure 2:
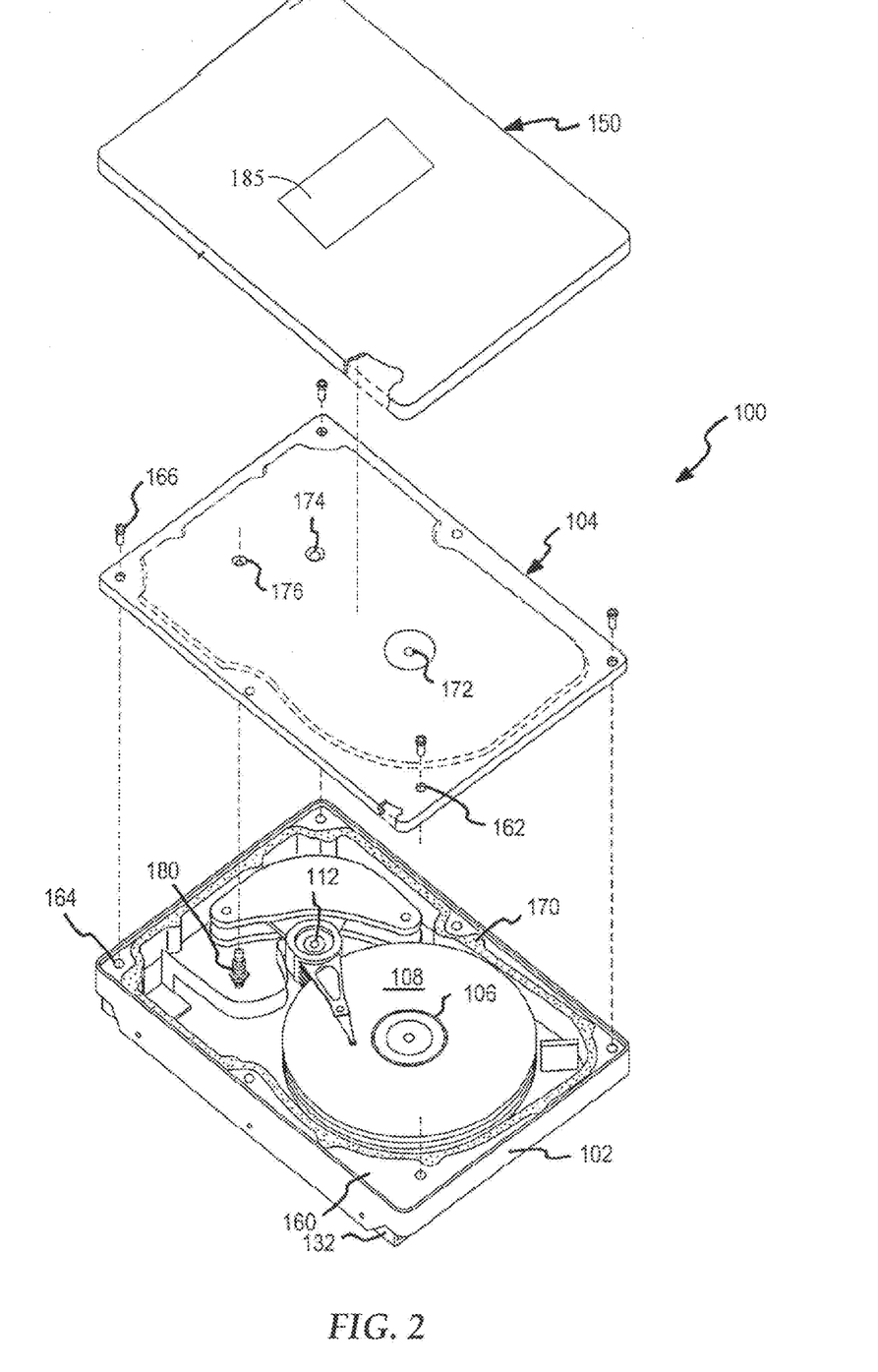
FIG. 2 is an exploded view of the disk drive shown in FIG. 1.

FIGS. 1 and 2 further illustrate a second, sealing cover 150 secured over the top of the first structural cover 104. The use of the second sealing cover 150 in combination with the structural cover 104 provides the requisite degree of sealing necessary to prevent the fill gas within the drive 100 from leaking out, and most water vapor from entering the drive 100, during the service lifetime of the drive, even with an integrated membrane electrode assembly 185 as described herein.

FIG. 2 is an exploded view of the disk drive 100 and the two covers 104 and 150. While the membrane electrode assembly 185 is shown integrated into cover 150, it may also be integrated into both covers 104 and 150 depending upon design parameters. It is noted that the base 102 includes a raised contact surface or shoulder 160 that extends around a perimeter of the base deck 102 to provide a mating surface for a perimeter of the structural cover 104. The cover 104 is preferably sculpted to match the shape of the contact surface 160, while screw holes 162 in the cover 104 match corresponding holes 164 in the raised shoulder 160 so that a plurality of screws 166 can be used to secure the cover 104 to the shoulder 160.

Prior to screwing the cover 104 to the base deck 102, a seal 170 is preferably placed on one of the raised shoulder 160 of the base 102 or the underside perimeter of the cover 104. In the embodiment shown in FIG. 2, a continuous rubber gasket seal 170 is positioned around the perimeter of the raised shoulder 160 so that the seal 170 engages the bottom surface of the cover 104 to seal the internal environment of the disk drive 100 against contaminants. The seal 170 is preferably arranged so that the screw holes 164 are positioned outside the perimeter of the seal 170 to prevent gas or contaminant leakage past the threaded screws 166. A suitable seal 170 is manufactured by the Dyneon Corp. of Oakdale, Minn.

FIG. 2 further illustrates that the structural cover 104 preferably provides structural support for the spindle motor 106 and the bearing shaft assembly 112 of the disk drive 100. Specifically, the cover 104 includes countersunk openings 172 and 174 that correspond to the spindle motor 106 and the bearing shaft assembly 112, respectively. The inclusion of the holes 172 and 174 allows the structural cover 104 to stabilize the spindle motor 106 and the actuator assembly 110. Additionally, the screws (not shown) holding the spindle motor 106 and the bearing shaft assembly 112 to the cover 104 include a pre-attached O-ring to provide a substantially gas tight seal with the corresponding holes 172 and 174 of the structural cover 104.

FIG. 2 also illustrates a location for a fill port 176 within the structural cover 104. The fill port 176 retains one end of a gas valve 180, such as a Schrader valve, while the opposite end of the valve 180 extends into the internal environment of the disk drive 100. Because the valve 180 extends downward from the cover 104, the fill port 176 is preferably located over a portion of the base deck 102 that does not contain either the disks 108 or the actuator assembly 110. As noted below, the fill port 176 need not be located in the cover 104 provided that the fill port 176 is located in a position that can be hermetically sealed. The fill port 176 is also preferably countersunk within the cover 104 so that a chuck (not shown) can mate with the valve 180 to fill the internal environment of the drive 100 with the fill gas. That is, once the cover 104 has been secured to the base deck 102 with the screws 166, and once additional screws (not shown) have been secured to the spindle motor 106 and the bearing shaft assembly 112 through the holes 172 and 174, respectively, a source of fill gas is preferably connected to the valve 180 to fill the interior of the drive with the gas. The gas supply system preferably provides a method of evacuating the drive before filling the drive with the fill gas.

As discussed above, disk drive 100 is configured as a HAMR drive. In a HAMR device, information bits are recorded in a storage layer at elevated temperatures in a specially configured magnetic media. The use of heat can overcome superparamagnetic effects that might otherwise limit the areal data density of the media. As such, HAMR devices may include near field transducers (NFTs) for delivering electromagnetic energy to a confined area of a rotating media, the area (spot size) exposed to the electromagnetic energy is heated, at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole.

The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as an NFT, optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region exceeding the Curie temperature having dimensions less than 100 nm.

Due to the intensity of the laser light and the small size of the NFT, the NFT and surrounding material are subject to a significant rise in temperature during writing. For example, the NFT can reach temperatures of about 350° C. to about 450° C. (e.g., ~400° C.) during write operations. In addition, humidity continues to build within the sealed structure over the course of operating—the HDD enclosure is not perfectly sealed from the ambient atmosphere. While a HAMR drive experiences the same humidity changes as a conventional drive, HAMR drives are much more sensitive to the humidity. The high areal density media and precision optical components of HAMR technology are especially vulnerable to temperature and humidity. These two parameters can affect the lifetime read/write head of the HDD.

For example, low humidity can significantly increase head lifetime. Current, conventional, HDDs use breather filters to decrease the drive humidity level. The filter can absorb the HDD internal water vapor and stop the infiltration of external water vapor. In a typical high humidity working condition with 17 g/Kg humidity mixing ratio, 22° C. temperature and 1 standard atmosphere, the breather filter can keep the HDD's internal humidity level under the expected humidity mixing ratio of 10 g/Kg for about one week using this passive, open-loop control process. After this, the filter is saturated and the humidity level will increase to the same level as ambient conditions outside the HDD. This time is much less than the expected lifetime of a HAMR recording head, which is about 1,000 hours.

As described below, a HAMR HDD may be designed with an active humidity control system. In certain embodiments, a dehumidifier and humidity and/or temperature sensor are integrated into the HDD. By means of the humidity/temperature sensor, the temperature and humidity level of the HDD is monitored in real time. When the humidity level is higher than a threshold, or expected mixing ratio level (e.g., 10 g/Kg), the dehumidifier is activated to remove water vapor from the HDD, thereby decreasing the humidity level and increasing the lifetime of the heads.

Figure 3:
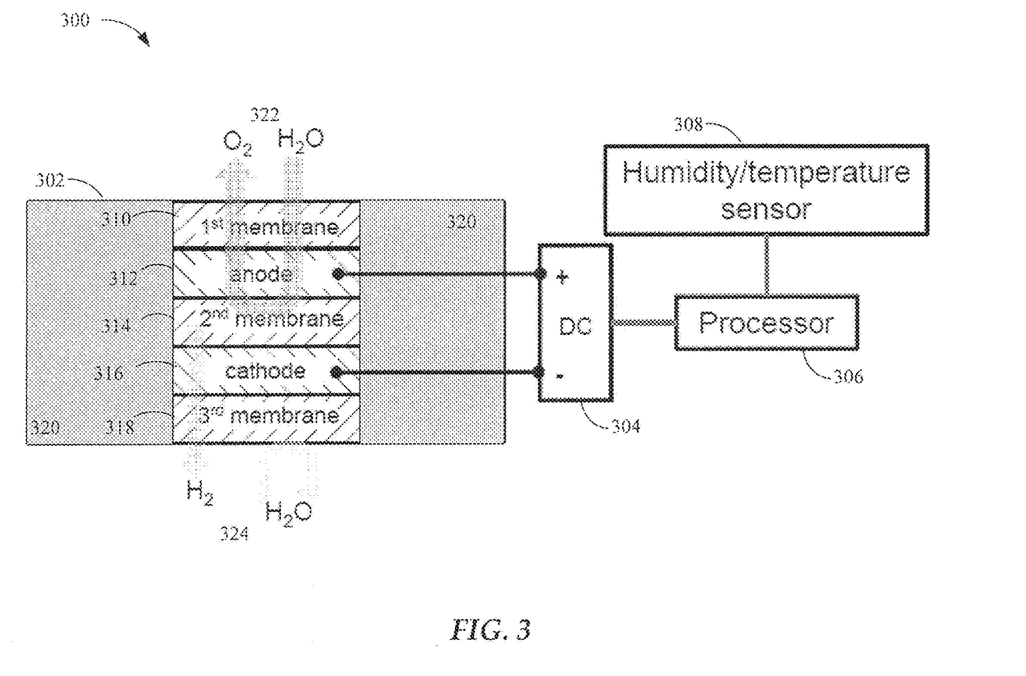
FIG. 3 is a block diagram of a humidity control system, in accordance with various embodiments.

The block diagram of FIG. 3 shows a system structure 300 according to an example embodiment. The system 300 includes a processor 306, an electrical power source 304, a membrane electrode assembly dehumidifier 302, and a humidity/temperature sensor 308, although more than one of each of these components may be used in various system configurations. While the energy source 304 is shown as a DC power source, other types that may be coupled to the processor/controller 306 may be used. In certain embodiments, the energy source 304 is disposed within, or proximate, the hard drive and may be an existing hard disk drive power supply of 5V and 12V. The controller/processor 306 may be a programmed processor disposed within the hard disk drive. For example, the controller 306 may be an existing chip located on a HDD printed circuit board, as discussed above. In certain embodiments, the sensor 308 is optional. However, when present, the sensor 308 may be configured to detect humidity and/or temperature. The sensor 308 may detect humidity as a mixing ratio, as relative humidity, as absolute humidity, or as another parameter. In certain embodiments, the sensor 308 is disposed within the HDD, for example, as located on an existing HDD internal printed circuit board, as discussed above.

The membrane electrode assembly dehumidifier includes multiple components—six are shown in FIG. 3. Five of the illustrated parts are internal parts that form a gas flow path that couples an inside of the hard disk drive 322 to an outside of the hard disk drive 324. The internal five parts are, from top to bottom in the figure (which corresponds to inside to outside of the HDD), a first membrane 310, an anode 312, a second membrane 314, a cathode 316, and third membrane 318. The sixth part is a fixture 320 surrounding the membrane electrode parts. The fixture 320 attaches the membrane electrode assembly dehumidifier to the HDD enclosure, such as one or more of covers 104 and 150 discussed above.

The membrane electrode assembly is configured to remove water vapor from the HDD via electrolysis. While the first membrane 310 may comprise a variety of materials, the materials are hydrophilic. The first membrane 310 absorbs water vapor from inside the HDD and transports it to the anode 312. The second membrane 314 is a dielectric electrolyte membrane that separates the oxygen and hydrogen in the water vapor to return the oxygen to the hard disk drive and pass the hydrogen to cathode 316 and the exterior of the drive. The second membrane may comprise a variety of materials, including solid polymers. The third membrane 318 may also comprise a variety of materials that are overall hydrophobic. The third membrane 318 repels external water vapor from entering the HDD, while letting hydrogen pass out of the HDD.

Figure 4:
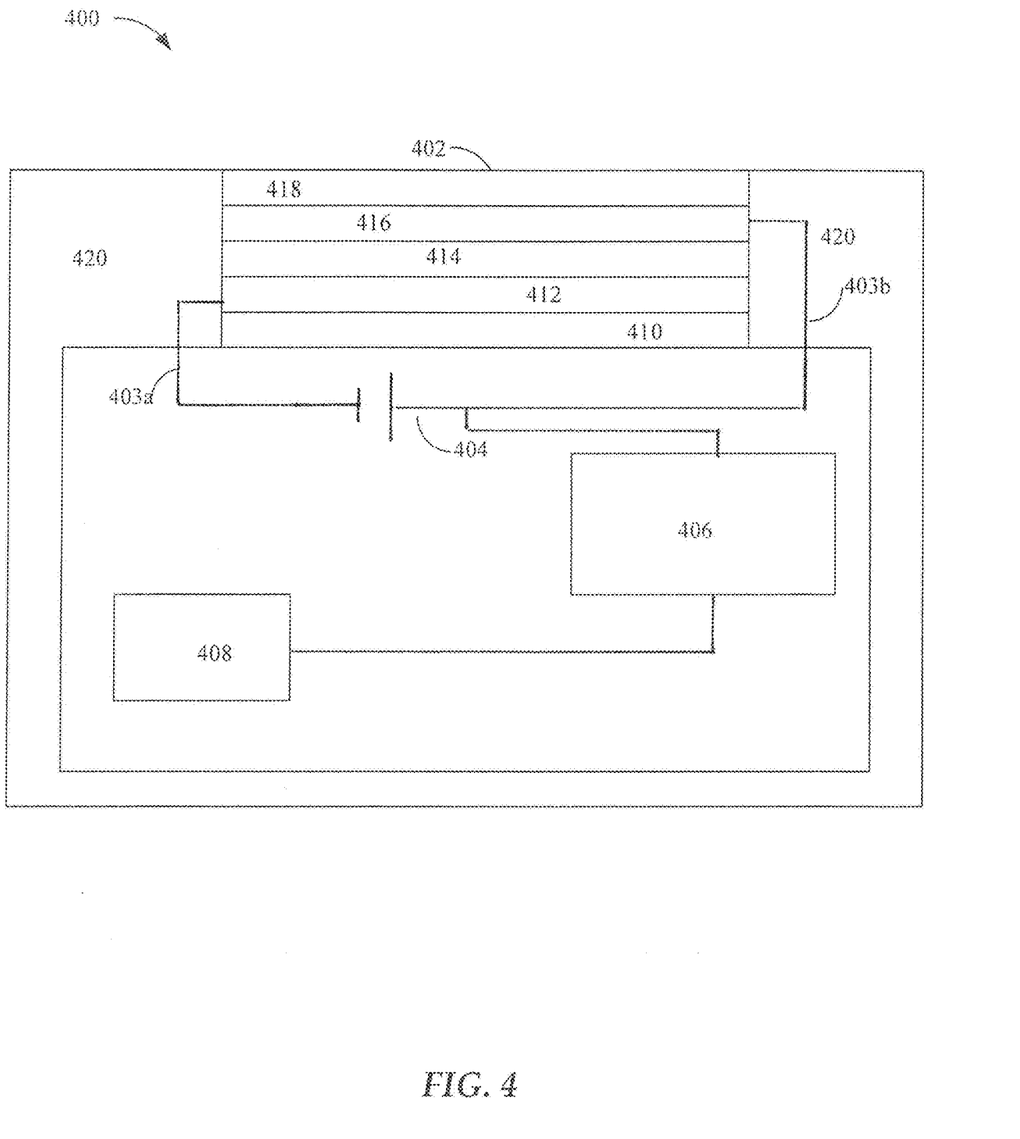
FIG. 4 is a block diagram of a humidity control system integrated into a heat-assisted magnetic recording hard disk drive, in accordance with various embodiments.

An example humidity control system is shown integrated into a HDD in the block diagram of FIG. 4. The HDD 400 is shown as a cross-section of the enclosure 420. The membrane electrode assembly 402 is shown integrated into a side of the enclosure 420. The assembly 402 may be integrated using a fixture as discussed above, or it may be integrated directly into the enclosure upon manufacture. While the membrane electrode assembly 402 is shown flush with the thickness of the enclosure 420, it may have a variety of thicknesses including protruding above the exterior surface (i.e., not flush), recessed from the exterior surface (i.e., not flush), or flush with the exterior surface but recessed or protruding with respect to the interior surface of the enclosure. The components of the membrane electrode assembly 402 are consistent with those described above in connection with FIG. 3. The membrane electrode assembly 402 includes a hydrophilic membrane 410, an anode 412, an electrolyte membrane 414, a cathode 416, and a hydrophobic membrane 418. The anode 412 and cathode 416 are coupled to conductive terminals 403a-b, which couple to energy source 404. A controller 406 is disposed within the HDD and is coupled to the energy source 404 and a sensor 408 also disposed within the HDD.

When the HDD is powered, the humidity/temperature sensor monitors the HDD's internal humidity level. In certain embodiments, the processor compares the real-time humidity mixing ratio with an expected value (i.e., a threshold). An example of such a threshold would be 10 g/Kg. If the detected mixing ratio exceeds the threshold value, the processor turns on the membrane electrode assembly dehumidifier. The dehumidifier will electrolytically change the HDD internal water vapor into oxygen and hydrogen. The oxygen is returned to the inside of the HDD, and the hydrogen is passed through the gas flow path and the third membrane 418 to be expelled outside of the HDD. The membrane electrode assembly dehumidifier continues this electrolysis until the internal humidity mixing ratio is less than a threshold (either the original, activating threshold, or another, lower mixing ratio threshold). Then, the membrane electrode assembly dehumidifier is deactivated until an elevated humidity level is again detected. As long as the drive is powered/operational, the sensor detects the internal HDD humidity, and the humidity control system actively turns on/off to maintain/adjust the humidity level within the HDD. This allows for an active, closed-loop control of the internal humidity level and avoids a continuous removal of humidity from the drive. This active monitoring and control provides for efficient water vapor removal and energy consumption.

Figure 5:
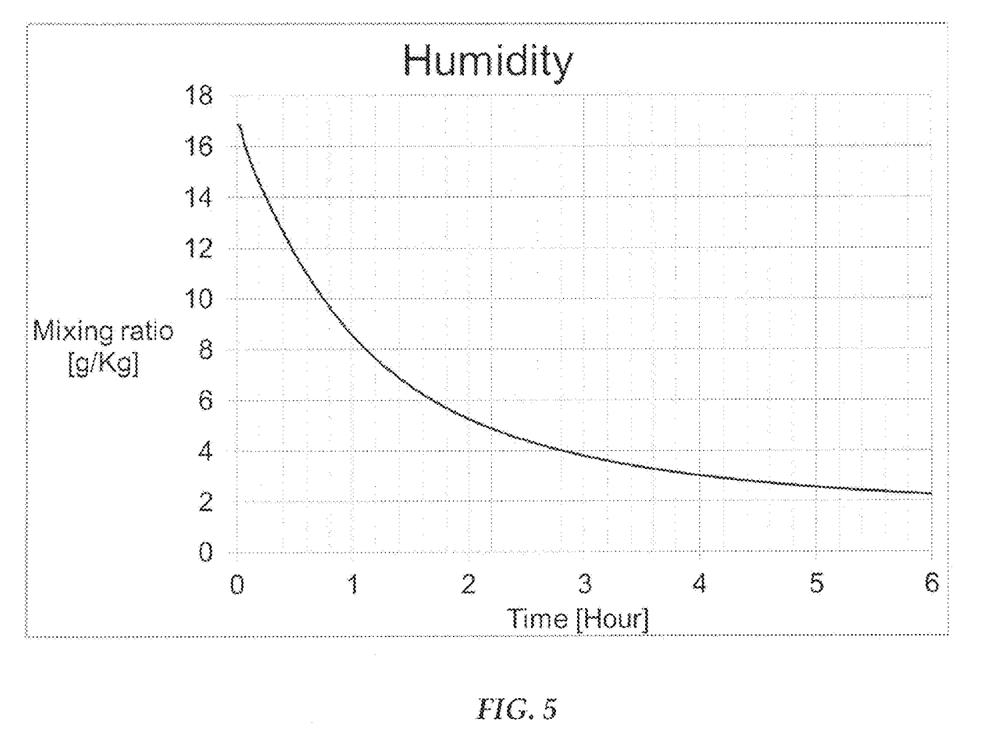
FIG. 5 is a graph of humidity as a function of time within a hard drive having an integrated humidity control system, in accordance with various embodiments.

FIG. 5 is a graph showing the change in humidity as a function of time during operation of the humidity control system integrated into a HAMR hard disk drive described herein. As can be seen, under typical operating conditions with a high humidity level of 17 g/Kg (RH 100%) and temperature of 22° C., the humidity control system takes forty-five minutes to decrease the humidity level (i.e., mixing ratio) to 10 g/Kg. This mixing ratio (10 g/Kg) is an example threshold mixing ratio level for preferred disk drive operating conditions. If the humidity control system is kept operating, as opposed to deactivating once the threshold mixing ratio is achieved, the hard disk drive internal humidity level will decrease to about 2 g/Kg after about six hours.

Figure 6:
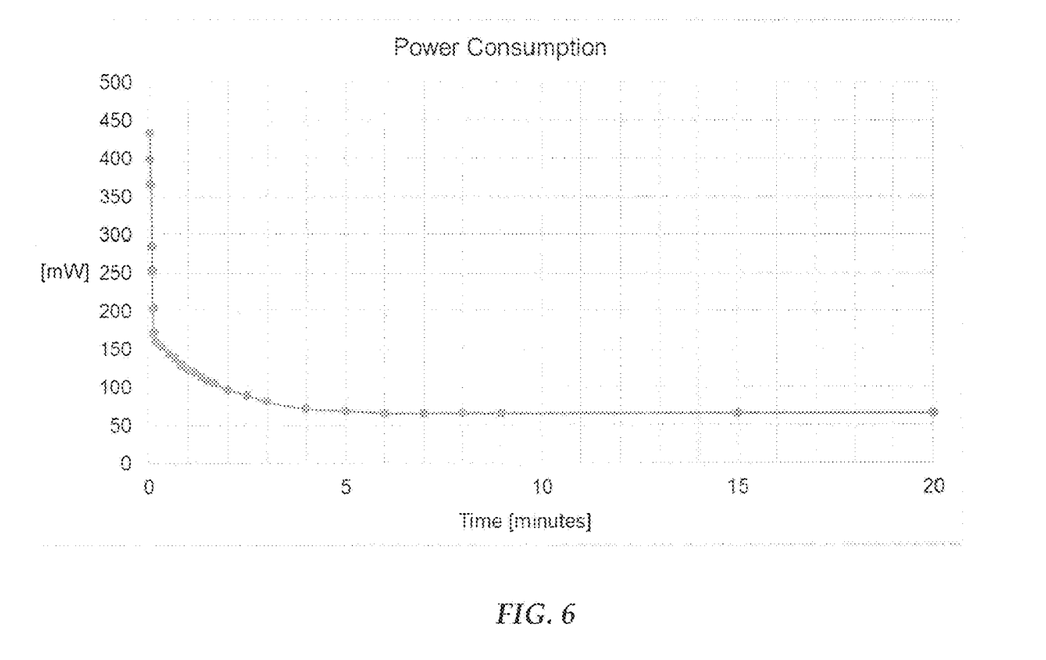
FIG. 6 is a graph of power consumption as a function of time of a hard drive having an integrated humidity control system, in accordance with various embodiments.

FIG. 6 is a graph illustrating the change in power consumption as a function of time for the operating drive of FIG. 5. The humidity control system's power consumption is only about 60 mW in long-term, as may be seen. This is negligible compared with the entire power consumption of a hard disk drive. Thus, in certain embodiments, the humidity control system can always be activated to decrease and maintain the hard disk drive internal humidity level. In such embodiments, a humidity and/or temperature sensor may not be necessary.

In other embodiments, the sensor provides a trigger mechanism for controlling a humidity control system. These embodiments are described in the flow chart of FIG. 7. The method is performed while a hard disk drive is operating. This allows for a sensor (e.g., humidity and/or temperature) to be operational by sharing a power source with the hard disk drive. In certain embodiments the sensor can comprise its own, or an additional, power source. The sensor detects humidity within the hard disk drive 702. Humidity may be detected using any manner of parameters (e.g., mixing ratio, relative humidity, absolute humidity, etc.). A controller evaluates whether the detected humidity is above a predetermined threshold 704. The threshold may change depending upon various factors such as the ambient environment of the drive, which may change depending upon where the drive is located (e.g., warm humid climate, cold dry climate) or such as the extent the drive is used.

Figure 7:
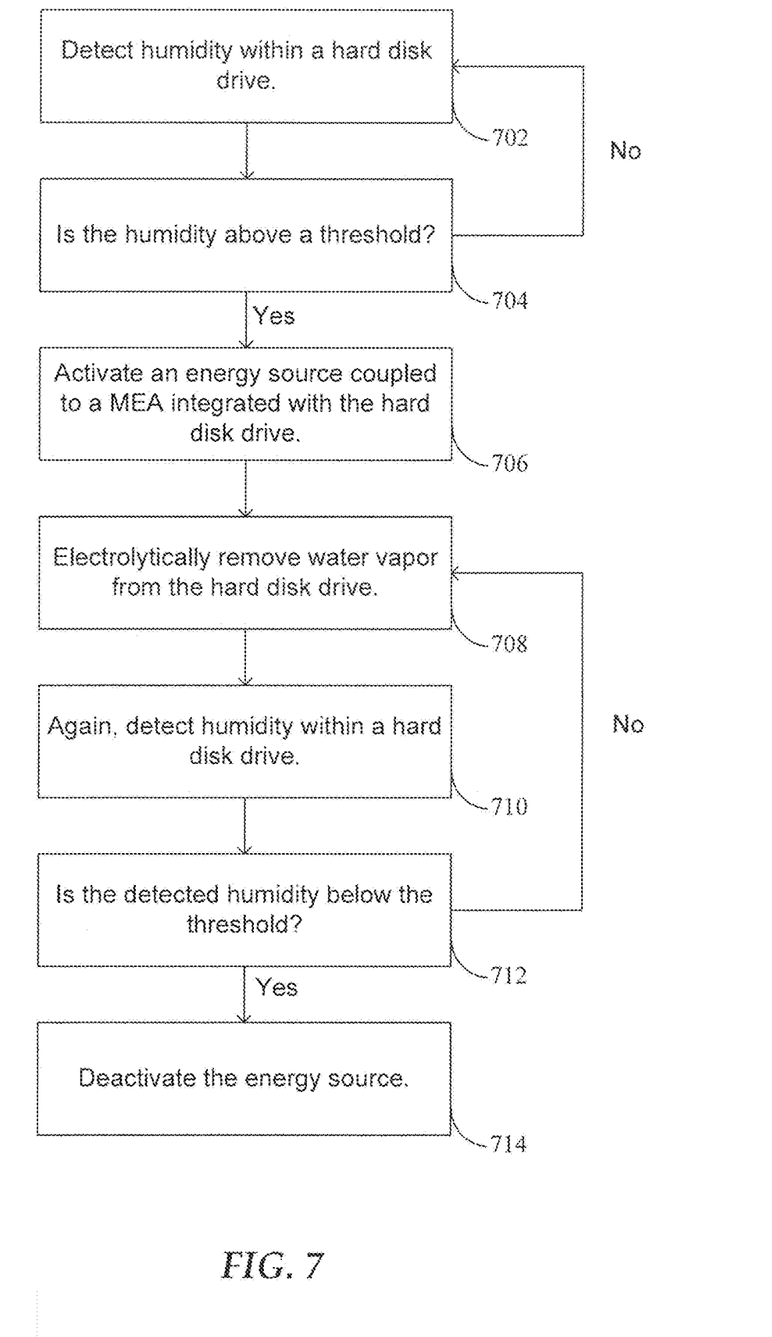
FIG. 7 is a flow chart showing operation of a humidity control system, in accordance with various embodiments.

If the humidity is confirmed to be below the threshold, the process returns to further detect the internal humidity 702. If the humidity is above the threshold, the controller activates an energy source 706. The energy source is coupled to a membrane electrode assembly integrated into the hard disk drive and configured to electrolytically remove water vapor from within the drive, as discussed above. After the humidity control system is activated for a predetermined amount of time 708, the sensor again detects the humidity level within the drive 710. The controller then evaluates whether the humidity level has decreased to below the threshold humidity level 712. If the humidity has not sufficiently decreased (e.g., dropped below the threshold value), the humidity control system remains activated and continues to remove water vapor from within the drive 708. If the humidity level has sufficiently decreased (e.g., dropped below the threshold), the energy source is deactivated to shut off the humidity control system until it is needed again 714. While the above is described using a single threshold, in certain embodiments, multiple threshold values could be utilized. For example, a first threshold could trigger activation of the humidity control system, but a second, lower or higher threshold value, could trigger deactivation of the system. Because the system is actively controlled by a closed-loop process/program, the thresholds can be customized and changed as needed.

The humidity control system described herein controls the internal humidity of a hard disk drive by use of an active, closed loop process and program. The system does not have moving parts, works silently and does not need to be regularly recharged or replaced. Power consumption is negligible and can be physically incorporated into existing form hard disk drive factors. Thus, the humidity control system described herein provides a long-term solution for controlling humidity when integrated into HAMR hard disk drives such that humidity may be mitigated or eliminated as a factor in HAMR disk drive failure The various embodiments described above may be implemented using circuitry, firmware, and/or software modules that interact to provide particular results. One of skill in the art can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. A hard disk drive, comprising:
   a sensor configured to detect a humidity mixing ratio within the hard disk drive, wherein the sensor is configured to continuously detect the humidity mixing ratio during operation of the hard disk drive;
   a membrane electrode assembly comprising a gas flow path that couples an inside of the hard disk drive to an outside of the hard disk drive, the gas flow path comprising a cathode and anode that electrolytically remove water vapor from the inside of the hard disk drive;
   an energy source coupled to the membrane electrode assembly; and
   a controller coupled to the sensor and the energy source, the controller configured to activate the energy source in response to the sensor detecting a humidity mixing ratio greater than a threshold humidity mixing ratio and to deactivate the energy source in response to the sensor detecting a humidity mixing ratio less than the threshold humidity mixing ratio.

2. The hard disk drive of claim 1, wherein the gas flow path comprises, in order from the inside of the hard disk drive to the outside of the hard disk drive:
   a hydrophilic first membrane;
   the anode;
   an electrolyte second membrane;
   the cathode; and
   a hydrophobic third membrane.

3. The hard disk drive of claim 2, wherein the electrolyte second membrane comprises a solid polymer.

4. The hard disk drive of claim 1, wherein the membrane electrode assembly is integrated into a portion of an enclosure of the hard disk drive.

5. The hard disk drive of claim 1, wherein the threshold is 10 g/Kg.

6. The hard disk drive of claim 1, wherein the hard disk drive is configured for heat-assisted magnetic recording.

7. The hard disk drive of claim 1, wherein the controller is disposed within the hard disk drive.

8. The hard disk drive of claim 1, wherein the energy source is disposed within the hard disk drive.

9. The hard disk drive of claim 1, wherein the sensor is disposed within the hard disk drive.

10. The hard disk drive of claim 1, further comprising a temperature sensor.

11. The hard disk drive of claim 1, wherein the sensor detects temperature within the hard disk drive.

12. A hard disk drive, comprising:
   a sensor configured to detect humidity within the hard disk drive, wherein the sensor is configured to continuously detect the humidity during operation of the hard disk drive;
   a membrane electrode assembly comprising a gas flow path that couples an inside of the hard disk drive to an outside of the hard disk drive, the gas flow path comprising a cathode and anode that electrolytically remove water vapor from the inside of the hard disk drive;
   an energy source coupled to the anode and the cathode of the membrane electrode assembly; and
   a controller coupled to the sensor and the energy source, the controller configured to activate the energy source in response to the sensor detecting a humidity greater than a first threshold humidity and to deactivate the energy source in response to the sensor detecting a humidity less than a second threshold humidity.

13. The hard disk drive of claim 12, wherein the sensor detects humidity as a mixing ratio.

14. The hard disk drive of claim 12, wherein the sensor detects humidity as relative humidity.

15. The hard disk drive of claim 12, wherein the first threshold humidity is the same as the second threshold humidity.

16. A method, comprising:
   detecting a first humidity by a sensor within a hard disk drive, wherein the sensor continuously detects humidity within the hard disk drive during operation of the hard disk drive;
   in response to the first humidity being greater than a threshold humidity, activating an energy source coupled to a membrane electrode assembly integrated into the hard disk drive and comprising a gas flow path that couples an inside of the hard disk drive to an outside of the hard disk drive;
   electrolytically removing water vapor from the inside of the hard disk drive via the membrane electrode assembly;
   detecting a second humidity by the sensor within the hard disk drive; and
   in response to the second humidity being less than the threshold humidity, deactivating the energy source.

17. The method of claim 16, wherein the energy source is repeatedly activated and deactivated in response to the sensor detecting a humidity respectively greater and less than the threshold humidity during operation of the hard disk drive for a closed loop control of the membrane electrode assembly.

* * * * *